US012801595B2

(12) United States Patent
Xie et al.

(10) Patent No.: US 12,801,595 B2
(45) Date of Patent: Nov. 17, 2026

(54) USER QUERY TO DATA QUERY TRANSFORMATION WITH KNOWLEDGE GRAPH RETRIEVAL-AUGMENTED GENERATION

(71) Applicant: SAP SE, Walldorf (DE)

(72) Inventors: Yonggang Xie, Singapore (SG); Tao Bai, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/935,731

(22) Filed: Nov. 4, 2024

(65) Prior Publication Data

US 2026/0127164 A1 May 7, 2026

(51) Int. Cl.

*G06F 16/00* (2019.01)
*G06F 16/21* (2019.01)
*G06F 16/242* (2019.01)
*G06F 16/248* (2019.01)

(52) U.S. Cl.

CPC .......... *G06F 16/243* (2019.01); *G06F 16/212* (2019.01); *G06F 16/248* (2019.01)

(58) Field of Classification Search

CPC .... G06F 16/243; G06F 16/242; G06F 16/248; G06F 16/21

See application file for complete search history.

(56) References Cited

U.S. PATENT DOCUMENTS

| | | | | |
|---|---|---|---|---|
| 2023/0289618 | A1* | 9/2023 | Takahashi | G06N 3/045 |
| 2025/0061291 | A1* | 2/2025 | Gardner | G06F 40/56 |
| 2025/0086211 | A1* | 3/2025 | Bolcer | G06F 16/3344 |
| 2025/0225108 | A1* | 7/2025 | Sharma | G06F 16/212 |
| 2026/0099488 | A1* | 4/2026 | Abraham | G06F 16/2423 |

* cited by examiner

*Primary Examiner* — Cheryl Lewis

(74) *Attorney, Agent, or Firm* — Fish & Richardson P.C.

(57) ABSTRACT

Methods, systems, and computer-readable storage media for receiving a user query provided in natural language and requesting data stored in a resource according to a data schema, determining a set of data schema and context data represented in a knowledge graph, the set of data schema and context data determined to be relevant to the user query from a super-set of data schema and context data stored in a graph database, generating a prompt using the user query and the set of data schema and context data, receiving a data query from a LLM that is responsive to the prompt, the data query being in a structured format, processing the data query to provide a query result, and displaying the query result to a user.

20 Claims, 5 Drawing Sheets

USER QUERY TO DATA QUERY TRANSFORMATION WITH KNOWLEDGE GRAPH RETRIEVAL-AUGMENTED GENERATION

BACKGROUND

Entities, such as commercial enterprises, use software systems to conduct operations. Example software systems can include, without limitation, enterprise resource management (ERP) systems, customer relationship management (CRM) systems, human capital management (HCM) systems, and the like. Enterprises continuously seek to improve and gain efficiencies in their operations. To this end, enterprises integrate systems in the domain of so-called intelligent enterprise, which can employ artificial intelligence (AI) that can include, for example, machine learning (ML) models. For example, AI can be used for data analytics and/or automating tasks in support of enterprise operations. AI, however, presents technical hurdles and risks that need to be mitigated in use by enterprises.

SUMMARY

Implementations of the present disclosure are directed to a query processing system that leverages a large language model (LLM) to convert user queries to data queries. More particularly, implementations of the present disclosure are directed to a query processing system that includes a knowledge graph for retrieval-augmented generation (RAG) in leveraging a LLM to convert user queries to data queries.

In some implementations, actions include receiving a user query provided in natural language and requesting data stored in a resource according to a data schema, determining a set of data schema and context data represented in a knowledge graph, the set of data schema and context data determined to be relevant to the user query from a super-set of data schema and context data stored in a graph database, generating a prompt using the user query and the set of data schema and context data, receiving a data query from a LLM that is responsive to the prompt, the data query being in a structured format, processing the data query to provide a query result, and displaying the query result to a user. Other implementations of this aspect include corresponding systems, apparatus, and computer programs, configured to perform the actions of the methods, encoded on computer storage devices.

These and other implementations can each optionally include one or more of the following features: a generating a prompt using the user query and the set of data schema and context data includes providing a query vector based on the user query, identifying a sub-set of vectors from a set of vectors by comparing vectors in a set of vectors to the query vector, and retrieving the set of data schema and context data from a database, the set of data schema and context data being associated with vectors in the sub-set of vectors; the set of data schema and context data is at least partially provided from a knowledge graph that represents the data schema and descriptions of entities; the knowledge graph is at least partially built by extracting description information from an enterprise data graph and parsing metadata represented in a set of data schema files; the set of data schema and context data includes hierarchical relationships between data objects that are to be queried and contextual information descriptive of properties of the data objects; the data query comprises a set of filter conditions and a uniform resource locator (URL) for the resource; and the structured format includes Javascript object notation (JSON).

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
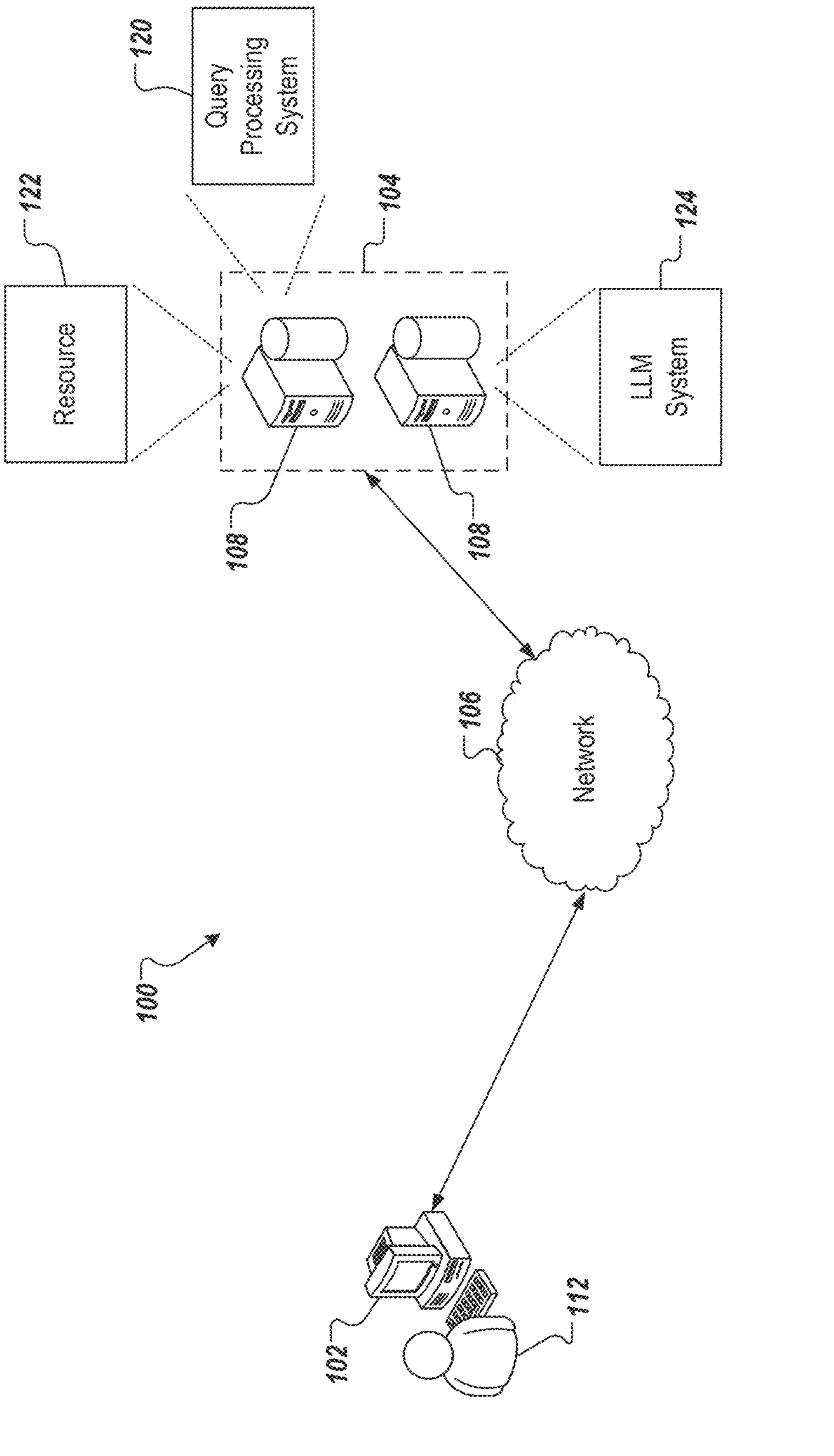
FIG. 1 depicts an example architecture that can be used to execute implementations of the present disclosure.

Implementations of the present disclosure are directed to a query processing system that leverages a large language model (LLM) to convert user queries to data queries. More particularly, implementations of the present disclosure are directed to a query processing system that includes a knowledge graph for retrieval-augmented generation (RAG) in leveraging a LLM to convert user queries to data queries.

Implementations can include actions of receiving a user query provided in natural language and requesting data stored in a resource according to a data schema, determining a set of relationship and context data represented in a knowledge graph, the set of data schema and context data determined to be relevant to the user query from a super-set of data schema and context data stored in a graph database, generating a prompt using the user query and the set of data schema and context data, receiving a data query from a LLM that is responsive to the prompt, the data query being in a structured format, processing the data query to provide a query result, and displaying the query result to a user.

To provide further context for implementations of the present disclosure, and as introduced above, artificial intelligence (AI) is increasingly being leveraged in applications that support enterprise operations. In the field of AI, so-called generative AI (GAI) has recently seen an explosion in popularity. GAI can be described as including foundation models that generate content based on training data. For example, foundation models can include LLMs, which are a form of GAI that can be used to generate text and perform other functions for a variety of use cases. The increasing power and popularity of GAI has seen enterprises seeking avenues to leverage GAI in improving enterprise operations. However, integrating GAI into enterprise platforms is a non-trivial task. For example, GAI can present various technical challenges, disadvantages, and limitations that have to be managed, which did not exist in the pre-GAI world.

For example, LLMs can be used to convert natural language into a structured format, such as a data query that confirms to a defined data schema. In an example use case, virtual agents (commonly referred to as chatbots) can receive user queries (natural language queries), generate prompts based on the user queries, prompt one or more LLMs using the prompts, and return responses (data (structured) queries) generated by the LLM(s). However, LLMs are provisioned by third-party service providers and are trained on training data from a broad range of domains. In short, LLMs are not domain-specific and, as such, do not perform well when applied to particular domains.

An example domain can include querying resources that maintain and store data that is structured according to a specific data schema, as discussed in further detail herein. In this example domain, a LLM can be prompted to provide a query that can be used to query a resource storing structured data. However, absent context, LLMs are unable to perform the task (e.g., the LLM returns a non-sensical query that cannot be processed by the resource).

In further detail, a LLM can be used to convert a user query (e.g., input to a chatbot in natural language) to an Open Data Protocol (OData) query (a data query that is structured). OData can be described as a standard that defines a structure for querying resources through RESTful application programming interfaces (APIs). Using a LLM to convert user queries into data queries, such as OData queries, can introduce significant efficiencies in terms of time and technical resources. In general, converting user queries to OData queries can include identifying an entity set referenced in the user query from underlying metadata and generating the OData query based on the entity set and metadata information. However, in generating OData queries, and even when provided with the metadata as context, LLMs frequently misidentify entity sets, particularly in relatively long metadata files, incorrectly assign properties to the entity sets, and struggle to convert natural language values to OData service values. This results in ineffective or unusable OData queries wasting time and technical resources.

These failures occur because LLMs face significant challenges with OData metadata. For example, the metadata can be long, complex, and lacks contextual information. For example, even when a LLM is provided with the metadata as context, the metadata is relatively long and includes metadata that is irrelevant to the user query, which degrades performance of LLMs in generating usable OData queries. As another example, the complicated and overlapping relationships within the metadata make it difficult for LLMs to accurately interpret the data structure. As still another example, the absence of contextual annotations in the metadata limits that ability of the LLMs to understand and process the data accurately. To illustrate these points, example data structures can be considered.

In a first data structure, an entity set 'Travel' has a property 'OverallStatus' and is associated with an entity set 'Airport' that includes a property "CountryCode' and a property 'Name.' As such, the first data structure represents a nested data structure (e.g., an entity set nested within another entity set). In an example, the first data structure can be used to store data representative of travel requests submitted by employees of an enterprise. In this example, the property 'OverallStatus' can be associated with contextual annotations that denote the status of the entity set 'Travel." Example contextual annotations can include 'A' for accepted, 'O' for open, and 'X' for rejected. When querying the property 'Name' of the entity set 'Airport' within the entity set 'Travel,' an LLM can fail in providing a usable OData query due to the lengthy and nested nature of such metadata. Further, understanding symbols like 'A' for accepted, 'O' for open, and 'X' for rejected, is problematic due to missing contextual annotations.

In a second data structure, an entity set 'SalesOrder' has a property 'ID' and a property 'Quantity.' An entity set 'Items' is nested in the entity set 'SalesOrder' and has a property 'ID' and a property 'Quantity.' In an example, the second data structure can be used to store data representative of sales orders and items within sales orders issued by an enterprise. The example of the second data structure again includes a nested entity set, but also includes properties of the same name across multiple entity sets. Because a LLM is absent an understanding of the hierarchy of the data structure, the LLM can fail in providing a usable OData query.

Even if the LLM is provided with the metadata defining the data structures, the failures still persist. With reference to the example data structures above, each has been simplified to highlight the above-described issues. However, real-world data structures can be significantly more complex and can include tens to hundreds, if not more, nested entity sets, some entity sets being nested upon nested, can include hundreds to thousands, if not more, contextual annotations, and can include hundreds to thousands, if not more, same named properties (e.g., every entity set has a property 'ID'). Consequently, the metadata provided to the LLM as context for converting a user query to an OData query contains a significant amount of metadata that is irrelevant to the user query (e.g., metadata about the entity set 'Travel' is irrelevant to a user query that implicates the entity set 'SalesOrder' and vice-versa). As such, the irrelevant metadata hinders the LLMs in performing the task of generating OData queries. Further, voluminous metadata might not be practical to use with LLMs that have input token limits (e.g., limits on the number of tokens (such as words) that can be included in the prompt to the LLM).

In view of the above context, implementations of the present disclosure provide a query processing system that leverages a LLM to convert user queries, provided in natural language, into data queries (structured queries, such as OData queries). More particularly, the query processing system transforms data from multiple data sources (e.g., OData metadata, contextual annotations, data schemas, etc.) into a knowledge graph. As described in further detail herein, in response to a user query, the knowledge graph is queried to provide context data that is relevant to the user query. For example, the knowledge graph is queried for RAG, described in further detail herein. The context data is used to prompt the LLM, which returns a data query in response to the prompt. In some examples, the data query is used to query a resource and return query results, which can be returned to a user that provided the user query.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a query processing system 120 for querying a resource 122 in response to a user query submitted by the user 112 through the client device 102. For example, the user 112 can interact with a chatbot on the client device 102 and can submit a user query to the query processing system 120 through the chatbot. As described in further detail herein, the query processing system 120 leverages a LLM provided by the LLM system 124. An example LLM can include, without limitation, gpt-3.5-turbo-16k provided by OpenAI. However, it is contemplated that any appropriate LLM can be used to realize implementations of the present disclosure.

Figure 2:
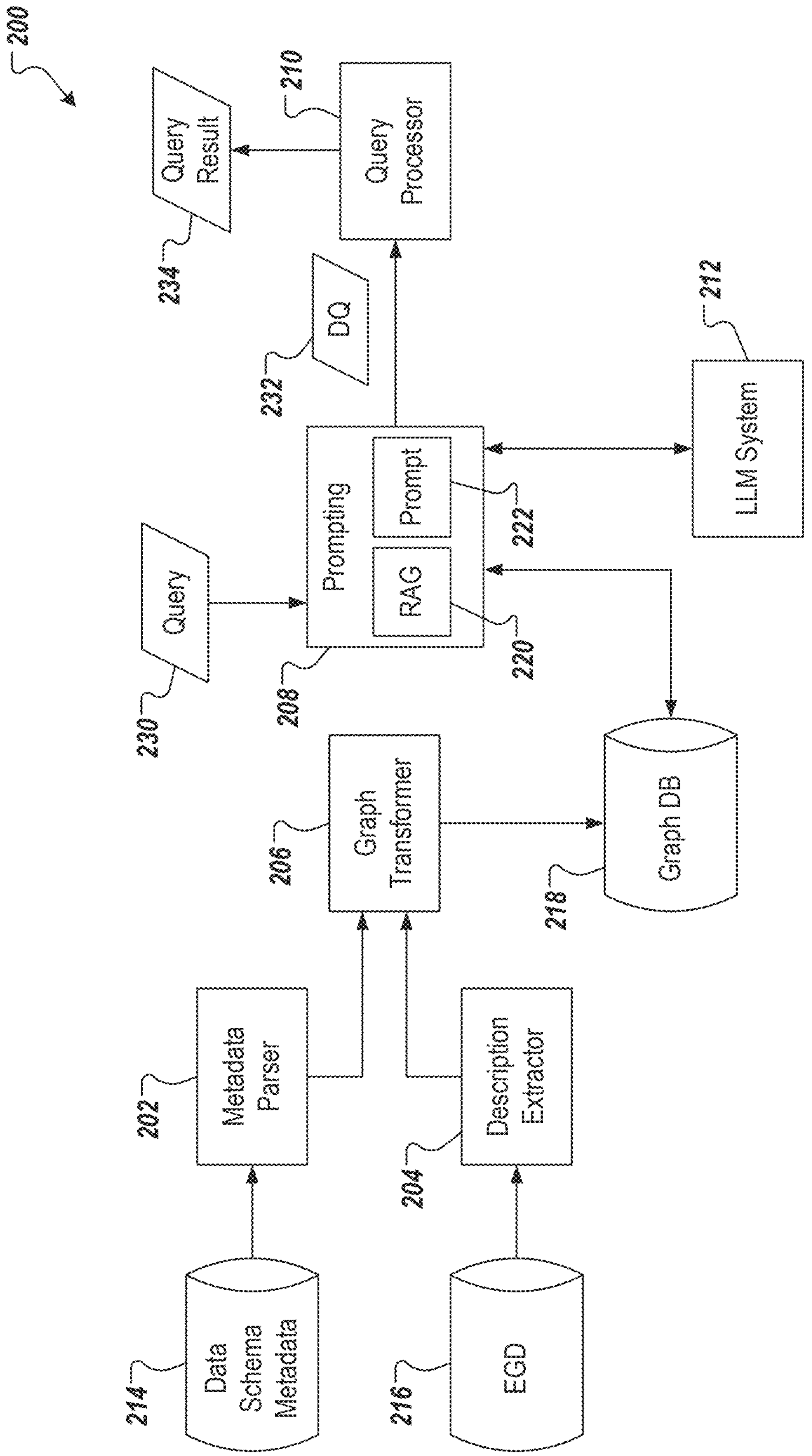
FIG. 2 depicts an example conceptual architecture in accordance with implementations of the present disclosure.

FIG. 2 depicts an example conceptual architecture 200 in accordance with implementations of the present disclosure. In the depicted example, the example conceptual architecture 200 includes a metadata parser 202, a description extractor 204, a graph transformer 206, a prompting module 208, a query processor 210, a LLM system 212, a data schema metadata repository 214, an enterprise graph database 216, a graph database 218. The prompting module 208 includes a RAG component 220 and a prompting component 222. In some examples, the query processing system of the present disclosure is made up of components of the example conceptual architecture 200 of FIG. 2. For example, the query processing system can include the metadata parser 202, the description extractor 204, the graph transformer 206, the prompting module 208, the query processor 210, the data schema metadata repository 214, the enterprise graph database 216, and the graph database 218.

As described in further detail herein, the data schema metadata repository 214 and the enterprise graph database 216 can be collectively considered as a knowledge base for providing contextual data for prompts to the LLM system 212. More particularly, the knowledge base is used to construct a knowledge graph (KG) that is used for RAG in generating prompts. It is contemplated, however, that the knowledge base can include any appropriate data source. For example, the knowledge base can also include a Core Data Services (CDS) data store. CDS can be described as an infrastructure that can be used by developers to create an underlying (persistent) data model, which the applications expose to UI clients.

During a design-time (e.g., prior to production use of the query processing system to transform user queries into data queries), a KG is constructed and is stored in the graph database 218 (e.g., a Neo4j graph database). During a run-time (e.g., production use of the query processing system to transform user queries into data queries), a user query 230 is received and a data query 232 is provided using the LLM system 212. The data query 232 is used by the query processor 210 to query a resource (e.g., a database system) for data responsive to the data query 232 and return a query result 234.

For purposes of non-limiting illustration, example user queries and example data queries that are generated based on the example user queries can be considered. A first example user query (e.g., input to a chatbot) is:

| |
|---|
| Can you find the sales data for Sales Organization 1510, specifically those records created from 20th December 2023 to 10th February 2024? |

A first example data query that is generated in response to the first example user query is:

First Example LLM Response for Data Query

{
“filtercriteria”:
“$filter=SalesOrganizationForFilter eq ‘1510’ and CreationDate ge 2023-12-20 and CreationDate le 2024-02-10”,
“properties_top”: “”,
“properties_orderby”: “”,
“url”: “{base_url}/SalesOrderItem?$filter=SalesOrganizationForFilter eq ‘1510’ and CreationDate ge 2023-12-20 and CreationDate le 2024-02-10&$select=SalesContract”,
“user_query”: “Can you find the sales data for Sales Organization 1510, specifically those records created from 20th December 2023 to 10th February 2024?”
}

A second example user query is:

Can you display information on the compensation processing status, overall sales process status, and sales group for rejected documents where the total net amount is greater than or equal to 100 Liberian dollars? Restrict the results to the top 28 in descending order.

A second example data query that is generated in response to the second example user query is:

| Second Example LLM Response for Data Query |
|---|
| { "filtercriteria": "$filter=TotalNetAmount ge 100.0 and OverallSDDocumentRejectionSts eq 'C' and TransactionCurrency eq 'LRD'", "properties_top": "$top=28", "properties_orderby": "$orderby=desc", "url": "{base_url}/$select=RetsMgmtCompnProcgStatus,OverallSDProcessStatus, SalesGroup&$filter=TotalNetAmount ge 100.0 and OverallSDDocumentRejectionSts eq 'C' and TransactionCurrency eq 'LRD'&$top=28&$orderby=desc", "user_query": "Can you display information on the compensation processing status, overall sales process status, and sales group for rejected documents where the total net amount is greater than or equal to 100 Liberian dollars? Restrict the results to the top 28 in descending order." } |

The first and second example data queries are each provided in Javascript object notation (JSON).

Figure 3:
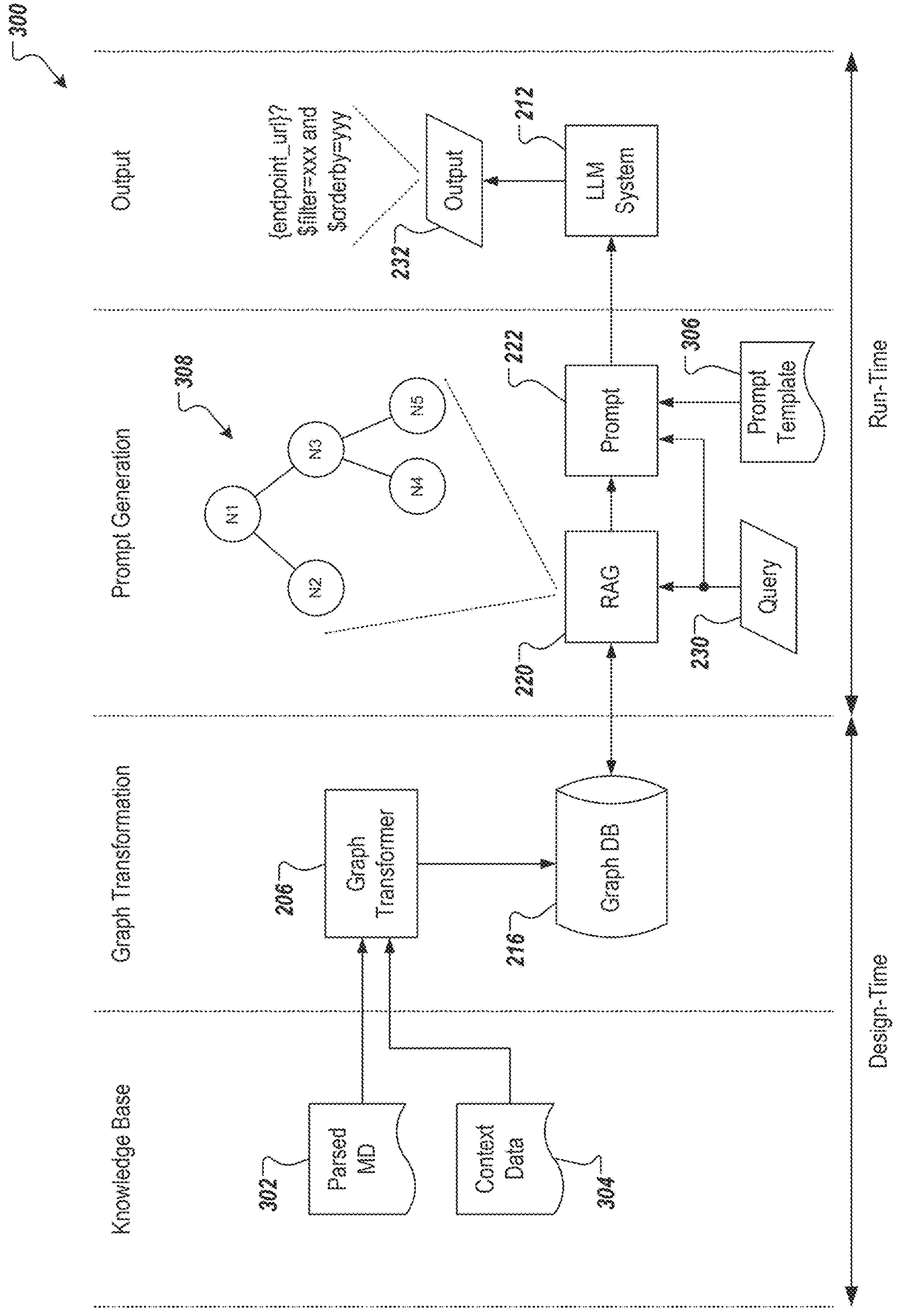
FIG. 3 depicts an example workflow in accordance with implementations of the present disclosure.

FIG. 3 depicts an example workflow 300 in accordance with implementations of the present disclosure. Actions performed during the design-time and the run-time are described in further detail herein with collective reference to FIGS. 2 and 3.

With reference to the design-time, the data schema metadata repository 214 stores metadata that is descriptive of a data schema that data is stored in within resources (e.g., database systems) that are to be queried to return data. For example, the data schema can be the OData data schema. In some examples, the metadata is stored in extensible markup language (XML) files. The metadata parser 202 (e.g., an XML loader) parses the metadata to provide parsed metadata 302. In some examples, the parsed metadata is provided as text data. For example, as an XML loader, the metadata parser 202 is intended for text extraction to feed into language models. In some examples, the parsed metadata can be provided in a document object model (DOM) (e.g., if intended for XML document manipulation). The parsed metadata 302 is input to the graph transformer 206.

The enterprise graph database 216 stores enterprise data represented as a semantically connected data graph with nodes representing entities (e.g., Workforce, Travel, Customer, Product, Sales, Finance) and edges representing relationships between entities. By way of non-limiting example, a customer can be associated with several sales orders, each sales order having many items, and each item referencing a product. For example, the data graph can be described as an all-in-one endpoint that represents all released data schema (e.g., data schema used by an enterprise) with detailed descriptions of each entity and properties of entities. More particularly, the data graph records contextual information of the properties (e.g., for 'Travel,' 'A' for accepted, 'O' for open, and 'X' for rejected). In some examples, the description extractor 204 extracts contextual information, as context data 304, from the data graph. For example, descriptions are retrieved and are bound to corresponding properties. Example descriptions can include "sap: text," "sap: quickinfo," and "descriptions of the property" from the mentioned sources. The retrieved descriptions are stored in text form. A non-limiting example from an enterprise data graph can include a "soldToParty" string, which includes a description of: The customer who orders the goods or services and is contractually responsible for sales orders. The context data 304 is input to the graph transformer 206.

In some implementations, the parsed metadata 302 and the context data 304 are transformed into a KG by the graph transformer 206 and the KG is stored in the graph database 218. For example, the graph transformer 206 can be provided as the Langchain LLM graph transformer, which can be described as transforming documents into graph-based documents using a LLM.

In the context of the present disclosure, a KG can be described as a graph dataset that represents networks of data entities and characterizes relationships between data entities. The KG includes a set of nodes and a set of edges, where the nodes represent respective entities (e.g., SalesOrder, Item, Product, ID, description of ID, Quantity, description of Quantity, OverallStatus, description of OverallStatus) and edges (directed, labeled edges) between nodes define relationships between the nodes. In some instances, two nodes can be connected by multiple edges with distinct labels. As a result, the KG is multi-relational graphs. The KG can be defined using triples, each triple being a fact (also referred to as link) that can be defined as t=(s, p, o), where s is a subject, p is a predicate, and o is an object. In the context of the present disclosure, example triples can be (ID, isPropertyOf, SalesOrder), (Item, isEntityOf, SalesOrder), (OverallStatus, isPropertyOf, Travel), (A, is ValueOf, OverallStatus), (A, isSymbolFor, Accepted).

In some implementations, the KG is vectorized to provide a set of vectors. In the context of the present disclosure, a vector, which can also be referred to as an embedding, is a multi-dimensional numerical representation of a portion of the KG. For example, each triple of the KG can be processed by an embedder, which embeds the triples in an embedding space, to provide the set of vectors. Example embedders can include, but are not limited to, NV-Embed-v2, stella_en_400M_v5. In some examples, the set of vectors is stored in a vector database. In some examples, each vector is indexed to its respective triple (nodes, edge) and contextual data associated with entities represented in the triple. Following is a non-limiting example of indexing a vector to a node of a KG:

{"index": 0 // index number in the vector database
"vector": [0.345, −0.678, ..., 0.901], // Embedding vector representing 'OverallSDDocumentRejectionSts', representing the semantic meaning of this node.
"metadata": {
"property__name": "OverallSDDocumentRejectionSts",
"type": "DocumentStatus",
"parent__entitiy": ["ManageSalesOrder"],
"relations": ["OverallSDDocumentRejectionSts" is a property in entity "ManageSalesOrder"] // relations can be customized in LLM graph transformer.
"child__entity":[None] // cases where the property is a complex type or navigation property.
"possible__values": [ "O", "R","X","C""],
"contextual__description": "Indicates the rejection status of a sales document in the processing workflow."
"value__list":{"O":"Open",
"R":"Rejeced",
"X": "Not Relevant",
"C":"Completed"}
}

During the run-time, the user query 230 is received and is processed by the prompting module 208 to provide the data query 232 from the LLM system 212. More particularly, the user query 230 is processed through an embedder to provide a query vector. In some examples, the embedder is the same embedder that is used to provide the set of vectors for the KG. In this manner, the query vector and each vector in the set of vectors are generated from the same embedding space and are of the same dimension.

In some examples, the RAG component 220 compares the query vector to each vector in the set of vectors to determine a sub-set of vectors. For example, a set of similarity scores can be determined, each similarity score representing a degree of similarity between the query vector and a respective vector in the set of vectors. In some examples, the similarity score is generated as a cosine similarity score. In some examples, the top X vectors (e.g., top 5 vectors) are selected based on the similarity scores (e.g., the 5 vectors that are most similar to the query vector) and are included in the sub-set of vectors. In some implementations, for each vector in the sub-set of vectors, the respective triple and any associated context data are retrieved (e.g., from the graph database 216). In this manner, relationships between, such as hierarchical relationships, entities and contextual information for the entities and/or relationships is provided.

In some implementations, a prompt is generated using a prompt template 306. For example, the prompt template can include static text (e.g., same text for each prompt that is to be generated) and placeholders. In some examples, the static text defines the task that is to be performed by the LLM system 212 (e.g., generate a data query), constrains the LLM system 212 (e.g., instructing the LLM that its response must be provided in JSON format), and other instructions for processing the prompt. In some examples, the prompt is generated by populating a placeholder with the user query and one or more placeholders with data returned for the vectors in the sub-set of vectors, which is collectively used as context for the LLM system 212 when processing the prompt. For example, a placeholder can include data representative of a portion 308 of the knowledge graph and context data associated with the portion. It can be noted that, by constraining the number of vectors in the sub-set of vectors to the top X vectors in the set of vectors, the portion 308 of the KG represents information that is most relevant to the user query. In this manner, the number of tokens included in the prompt is constrained, which reduces the burden on the LLM in processing the prompt, and the LLM is not provided with irrelevant information that could degrade performance of the LLM.

In some implementations, the response from the LLM system 212 is processed to provide the data query 232 used to query a resource. In some examples, the response returned from the LLM system 212 is a JSON string (text) (e.g., example LLM response above) that is converted into a JSON object (e.g., using the json.loads( ) function from python json library). Filter conditions, sorting options, limits, selected properties, and the like are determined from the JSON object and extracted data is aligned with query syntax of the data schema. For example, TopCriteria: {value:[3]}, will be converted to OData query syntax, $top=3. A URL for querying the resource is constructed by concatenating the formatted components (all the criteria) into a complete URL, such as the following, non-limiting example:

{
"filtercriteria": {
"filters": ["OverallSDDocumentRejectionSts",],
"operators": ["eq"],
"values": ["C"]},
"properties__top": {"values": [10]},
"properties__orderby": {
"properties": ["CreatedDate"],
"order": ["desc"]},
"selectproperties": {"properties": ["CreatedByUser", "SalesOrganizationForFilter"]},
}

Figure 4A:
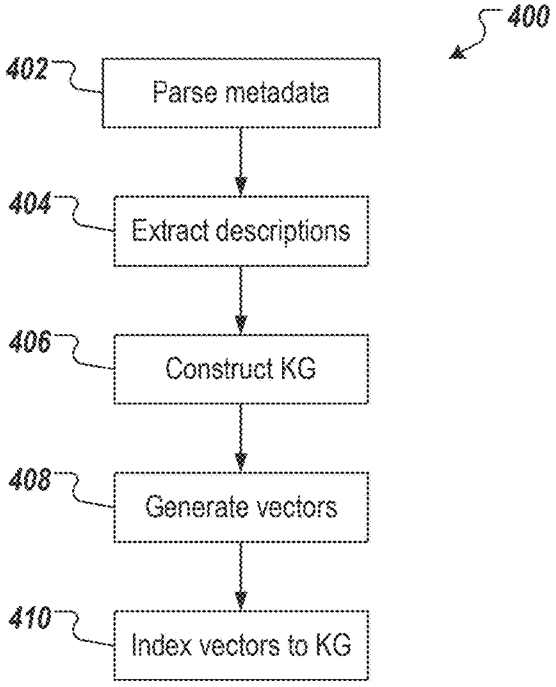
FIGS. 4A and 4B depict example processes that can be executed in accordance with implementations of the present disclosure.

FIG. 4A depicts an example process 400 that can be executed in accordance with implementations of the present disclosure. In some examples, the example process 400 is provided using one or more computer-executable programs executed by one or more computing devices.

Metadata is parsed (402). For example, and as described herein with reference to FIGS. 2 and 3, the metadata parser 202 parses the metadata that is stored in the data schema metadata repository 214 to provide parsed metadata 302. Descriptions are extracted (404). For example, and as described herein, the description extractor 204 extracts contextual information (descriptions), as context data 304, from the data graph that is stored in the enterprise graph database 216.

A KG is constructed (406). For example, and as described herein, the parsed metadata 302 and the context data 304 are transformed into a KG by the graph transformer 206 and the KG is stored in the graph database 218. A set of vectors is generated (408) and the vectors in the set of vectors are indexed to the KG (410). For example, and as described herein, each triple of the KG can be processed by an embedder, which embeds the triples in an embedding space, to provide the set of vectors. In some examples, the set of vectors is stored in a vector database and each vector is indexed to its respective triple (nodes, edge) and contextual data associated with entities represented in the triple.

Figure 4B:
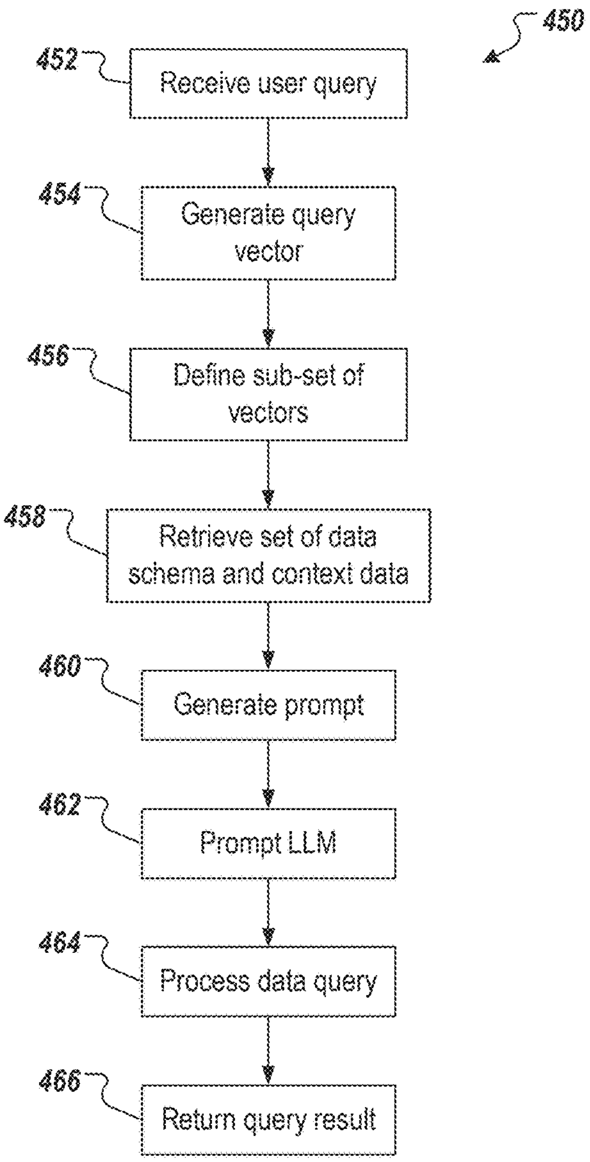

FIG. 4B depicts an example process 450 that can be executed in accordance with implementations of the present disclosure. In some examples, the example process 450 is provided using one or more computer-executable programs executed by one or more computing devices.

A user query is received (452) and a query vector is generated (454). For example, and as described herein, the user query 230 is received and is processed through an embedder to provide a query vector. A sub-set of vectors is defined (456). For example, and as described herein, the query vector is compared to each vector in the set of vectors to determine a set of similarity scores, each similarity score representing a degree of similarity between the query vector and a respective vector in the set of vectors. In some examples, the similarity score is generated as a cosine similarity score. In some examples, the top X vectors (e.g., top 5 vectors) are selected based on the similarity scores (e.g., the 5 vectors that are most similar to the query vector) and are included in the sub-set of vectors. A set of data schema and context data is retrieved (458). For example, and as described herein, for each vector in the sub-set of vectors, the respective triple and any associated context data are retrieved (e.g., from the graph database 216) and are used as the set of data schema and context data.

A prompt is generated (460) and a LLM is prompted (462). For example, and as described herein, the prompt is generated using the prompt template 306 by populating a placeholder with the user query and one or more placeholders with the set of data schema and context data returned for the vectors in the sub-set of vectors, which is collectively used as context for the LLM system 212 when processing the prompt. The LLM system 212 is prompted (e.g., through an API call) using the prompt and the LLM system 212 returns a data query responsive to the prompt. The data query is processed (464). For example, and as described herein, the data query 232 is used by the query processor 210 to query a resource (e.g., a database system) for data responsive to the data query 232 and return a query result 234. The query result is returned (466). For example, and as described herein, the query result is displayed to the user.

Figure 5:
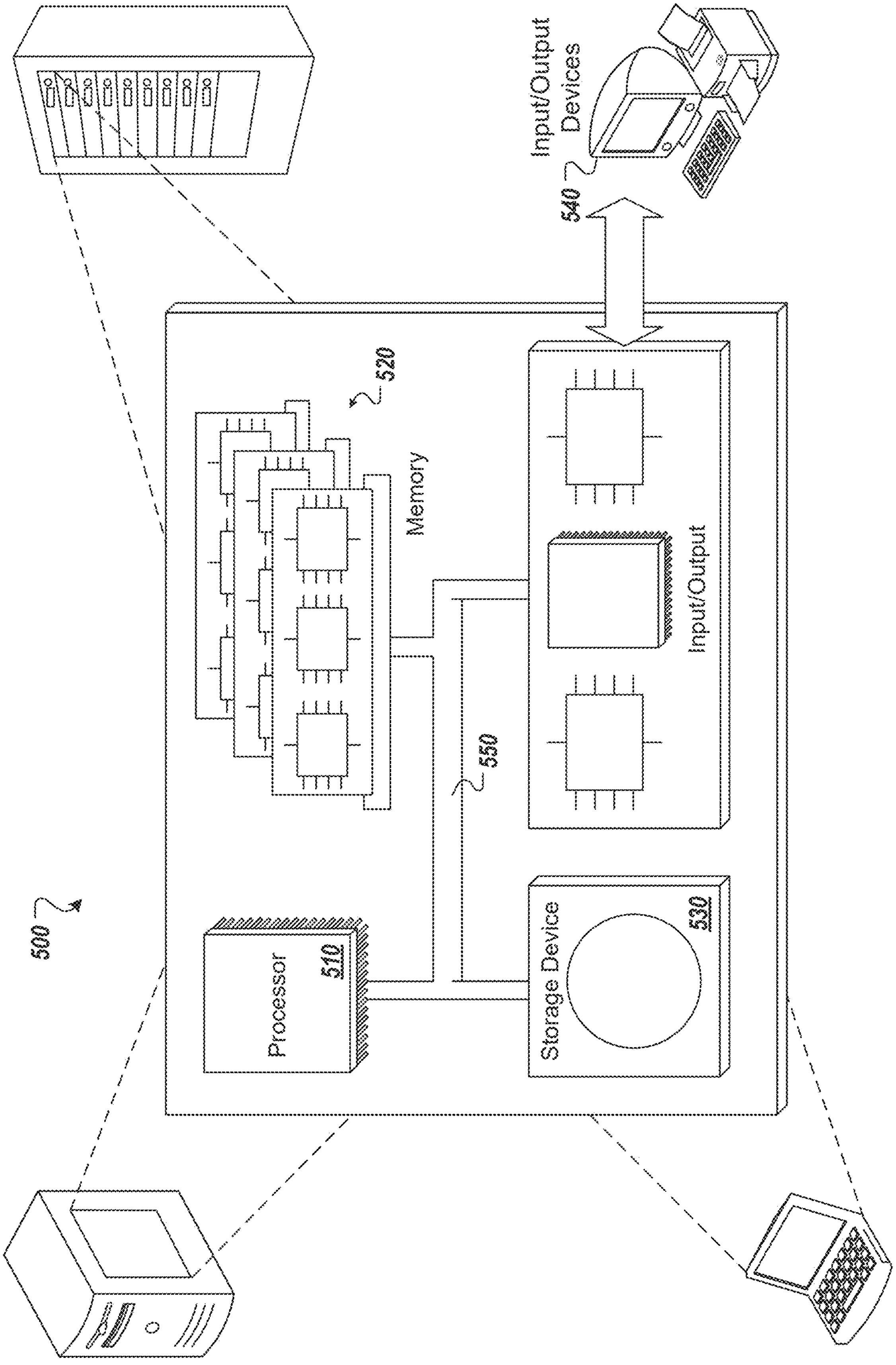
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for querying resources using structured queries generated by large language models (LLMs), the method being executed by one or more processors and comprising:

receiving a user query provided in natural language and requesting data stored in a resource according to a data schema;

determining a set of data schema and context data represented in a knowledge graph stored in a graph database, the knowledge graph comprising multi-relational graphs using triples, each triple having a vector generated therefor that is generated by processing the triple through an embedder to embed the triple in an embedding space, each vector being indexed to its respective triple and contextual data associated with entities represented in the triple, the set of data schema and context data being determined by querying the graph database and are relevant to the user query from a super-set of data schema and context data stored in the knowledge graph within the graph database;

generating a prompt using the user query and the set of data schema and context data;

receiving a data query from a LLM that is responsive to the prompt, the data query being in a structured format;

processing the data query to provide a query result; and displaying the query result to a user.

2. The method of claim 1, wherein generating a prompt using the user query and the set of data schema and context data comprises:

providing a query vector based on the user query;

identifying a sub-set of vectors from a set of vectors by comparing vectors in a set of vectors to the query vector; and retrieving the set of data schema and context data from a database, the set of data schema and context data being associated with vectors in the sub-set of vectors.

3. The method of claim 1, wherein the set of data schema and context data is at least partially provided from the knowledge graph that represents the data schema and descriptions of entities.

4. The method of claim 3, wherein the knowledge graph is at least partially built by extracting description information from an enterprise data graph and parsing metadata represented in a set of data schema files.

5. The method of claim 1, wherein the set of data schema and context data comprises hierarchical relationships between data objects that are to be queried and contextual information descriptive of properties of the data objects.

6. The method of claim 1, wherein the data query comprises a set of filter conditions and a uniform resource locator (URL) for the resource.

7. The method of claim 1, wherein the structured format comprises Javascript object notation (JSON).

8. A non-transitory computer-readable storage medium coupled to one or more processors and having instructions stored thereon which, when executed by the one or more processors, cause the one or more processors to perform operations for querying resources using structured queries generated by large language models (LLMs), the operations comprising:

receiving a user query provided in natural language and requesting data stored in a resource according to a data schema;

determining a set of data schema and context data represented in a knowledge graph stored in a graph database, the knowledge graph comprising multi-relational graphs using triples, each triple having a vector generated therefor that is generated by processing the triple through an embedder to embed the triple in an embedding space, each vector being indexed to its respective triple and contextual data associated with entities represented in the triple, the set of data schema and context data being determined by querying the graph database and are relevant to the user query from a super-set of data schema and context data stored in the knowledge graph within the graph database;

generating a prompt using the user query and the set of data schema and context data;

receiving a data query from a LLM that is responsive to the prompt, the data query being in a structured format;

processing the data query to provide a query result; and displaying the query result to a user.

9. The non-transitory computer-readable storage medium of claim 8, wherein generating a prompt using the user query and the set of data schema and context data comprises:

providing a query vector based on the user query;

identifying a sub-set of vectors from a set of vectors by comparing vectors in a set of vectors to the query vector; and retrieving the set of data schema and context data from a database, the set of data schema and context data being associated with vectors in the sub-set of vectors.

10. The non-transitory computer-readable storage medium of claim 8, wherein the set of data schema and context data is at least partially provided from the knowledge graph that represents the data schema and descriptions of entities.

11. The non-transitory computer-readable storage medium of claim 10, wherein the knowledge graph is at least partially built by extracting description information from an enterprise data graph and parsing metadata represented in a set of data schema files.

12. The non-transitory computer-readable storage medium of claim 8, wherein the set of data schema and context data comprises hierarchical relationships between data objects that are to be queried and contextual information descriptive of properties of the data objects.

13. The non-transitory computer-readable storage medium of claim 8, wherein the data query comprises a set of filter conditions and a uniform resource locator (URL) for the resource.

14. The non-transitory computer-readable storage medium of claim 8, wherein the structured format comprises Javascript object notation (JSON).

15. A system, comprising:

a computing device; and a computer-readable storage device coupled to the computing device and having instructions stored thereon which, when executed by the computing device, cause the computing device to perform operations for querying resources using structured queries generated by large language models (LLMs), the operations comprising:

receiving a user query provided in natural language and requesting data stored in a resource according to a data schema;

determining a set of data schema and context data represented in a knowledge graph stored in a graph database, the knowledge graph comprising multi-relational graphs using triples, each triple having a vector generated therefor that is generated by processing the triple through an embedder to embed the triple in an embedding space, each vector being indexed to its respective triple and contextual data associated with entities represented in the triple, the set of data schema and context data being determined by querying the graph database and are relevant to the user query from a super-set of data schema and context data stored in the knowledge graph within the graph database;

generating a prompt using the user query and the set of data schema and context data;

receiving a data query from a LLM that is responsive to the prompt, the data query being in a structured format;

processing the data query to provide a query result; and displaying the query result to a user.

16. The system of claim 15, wherein generating a prompt using the user query and the set of data schema and context data comprises:

providing a query vector based on the user query;

identifying a sub-set of vectors from a set of vectors by comparing vectors in a set of vectors to the query vector; and retrieving the set of data schema and context data from a database, the set of data schema and context data being associated with vectors in the sub-set of vectors.

17. The system of claim 15, wherein the set of data schema and context data is at least partially provided from the knowledge graph that represents the data schema and descriptions of entities.

18. The system of claim 17, wherein the knowledge graph is at least partially built by extracting description information from an enterprise data graph and parsing metadata represented in a set of data schema files.

19. The system of claim 15, wherein the set of data schema and context data comprises hierarchical relationships between data objects that are to be queried and contextual information descriptive of properties of the data objects.

20. The system of claim 15, wherein the data query comprises a set of filter conditions and a uniform resource locator (URL) for the resource.

* * * * *